United States Patent
Han

(10) Patent No.: US 11,436,252 B2
(45) Date of Patent: Sep. 6, 2022

(54) DATA PROCESSING METHODS, APPARATUSES, AND DEVICES

(71) Applicant: ALIPAY (HANGZHOU) INFORMATION TECHNOLOGY CO., LTD., Zhejiang (CN)

(72) Inventor: Zhe Han, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/364,062

(22) Filed: Jun. 30, 2021

(65) Prior Publication Data

US 2021/0326357 A1 Oct. 21, 2021

(30) Foreign Application Priority Data

Sep. 17, 2020 (CN) .......................... 202010978072.9

(51) Int. Cl.
*G06F 16/27* (2019.01)
*G06F 16/2458* (2019.01)
*G06F 3/04842* (2022.01)
*G06Q 10/10* (2012.01)

(52) U.S. Cl.
CPC .......... *G06F 16/27* (2019.01); *G06F 16/2468* (2019.01); *G06F 3/04842* (2013.01); *G06Q 10/10* (2013.01)

(58) Field of Classification Search
CPC .. G06F 16/27; G06F 16/2468; G06F 3/04842; G06Q 10/10
USPC ........................................................ 707/607
See application file for complete search history.

(56) References Cited

U.S. PATENT DOCUMENTS

| | | | |
|---|---|---|---|
| 10,755,252 B1 * | 8/2020 | Li | H04L 9/0637 |
| 10,789,339 B1 * | 9/2020 | Li | H04L 9/3297 |
| 10,872,341 B1 * | 12/2020 | Beckman | G06N 20/00 |
| 2019/0347290 A1 | 11/2019 | Yang | |

(Continued)

FOREIGN PATENT DOCUMENTS

| | | |
|---|---|---|
| CN | 106681524 | 5/2017 |
| CN | 107832384 | 3/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Joshua Bullock
(74) *Attorney, Agent, or Firm* — Fish & Richardson P.C.

(57) ABSTRACT

A data processing method, apparatus, and device is provided. The method includes receiving, by a blockchain node, a data processing request sent by a first device associated with a first user, invoking a first smart contract deployed in a blockchain network, and extracting a feature value of first original data to be processed included in the data processing request based on the first smart contract; matching historical data saved in the blockchain network based on the extracted feature value so as to determine whether there is target historical data whose similarity with the first original data satisfies a predetermined condition in the historical data; and performing corresponding processing based on matching result information of the matching processing.

18 Claims, 12 Drawing Sheets

(56) References Cited

U.S. PATENT DOCUMENTS

| | | | |
|---|---|---|---|
| 2020/0133955 A1* | 4/2020 | Padmanabhan | G06F 16/2379 |
| 2020/0250374 A1 | 8/2020 | Huang et al. | |
| 2020/0372133 A1* | 11/2020 | Li | G06F 21/16 |
| 2020/0372135 A1* | 11/2020 | Li | H04L 9/3242 |
| 2020/0372137 A1* | 11/2020 | Li | G06F 21/16 |
| 2020/0372138 A1* | 11/2020 | Li | G06F 21/16 |
| 2020/0372594 A1* | 11/2020 | Li | H04L 63/123 |
| 2020/0372595 A1* | 11/2020 | Li | G06F 21/16 |
| 2020/0372835 A1* | 11/2020 | Li | H04N 1/4486 |
| 2021/0103581 A1* | 4/2021 | Lee | G06F 16/2365 |
| 2021/0106920 A1* | 4/2021 | Lim | A63F 13/335 |

FOREIGN PATENT DOCUMENTS

| | | |
|---|---|---|
| CN | 110472201 | 11/2019 |
| CN | 111538963 | 8/2020 |
| KR | 101983529 | 5/2019 |
| WO | WO 2020172382 | 8/2020 |

OTHER PUBLICATIONS

Nakamoto, "Bitcoin: A Peer-to-Peer Electronic Cash System," www.bitcoin.org, 2005, 9 pages.

Extended European Search Report in European Application No. 21182273.9 dated Dec. 7, 2021, 12 pages.

* cited by examiner

DATA PROCESSING METHODS, APPARATUSES, AND DEVICES

CROSS-REFERENCE TO RELATED APPLICATIONS

This application claims priority to Chinese Patent Application No. 202010978072.9, filed on Sep. 17, 2020, which is hereby incorporated by reference in its entirety.

TECHNICAL FIELD

The present file relates to the field of data processing technologies, and in particular, to data processing methods, apparatuses, and devices.

BACKGROUND

In recent years, more and more attention has been paid to copyright protection. In order to avoid infringement, users' works are often subjected to duplicate judgment processing. The current duplicate judgment processing is mainly performed based on a centralized database and by way of hash value matching. However, the centralized database has the risk of being attacked. As a consequence, the credibility of a duplicate judgment processing result is not high. Moreover, calculated hash values are different when a punctuation mark or a pixel value of an image is modified, thus slight modifications to the works can escape from infringement determination, and the accuracy of the duplicate judgment processing result is relatively low.

SUMMARY

One or more embodiments of the present specification provide data processing methods, applied to a blockchain node. The method includes the following: A data processing request sent by a first user is received. The data processing request includes first original data to be processed. A first smart contract deployed in a blockchain network is invoked, and a feature value of the first original data is extracted based on the first smart contract. Historical data saved in the blockchain network is matched based on the feature value so as to determine whether there is target historical data whose similarity with the first original data satisfies a predetermined condition in the historical data. Corresponding processing is performed based on matching result information of the matching processing.

One or more embodiments of the present specification provide a data processing apparatus, applied to a blockchain node. The apparatus includes a receiving module, configured to receive a data processing request sent by a first user. The data processing request includes first original data to be processed. The apparatus further includes an extraction module, configured to invoke a first smart contract deployed in a blockchain network and extract a feature value of the first original data based on the first smart contract. The apparatus further includes a matching module, configured to match historical data saved in the blockchain network based on the feature value so as to determine whether there is target historical data whose similarity with the first original data satisfies a predetermined condition in the historical data. The apparatus further includes a processing module, configured to perform corresponding processing based on matching result information of the matching processing.

One or more embodiments of the present specification provide a data processing device. The device includes a processor. The device further includes a memory configured to store computer-executable instructions. The computer-executable instructions, when being executed, enable the processor to: receive a data processing request sent by a first user, where the data processing request includes first original data to be processed; invoke a first smart contract deployed in a blockchain network, and extract a feature value of the first original data based on the first smart contract; match historical data saved in the blockchain network based on the feature value so as to determine whether there is target historical data whose similarity with the first original data satisfies a predetermined condition in the historical data; and perform corresponding processing based on matching result information of the matching processing.

One or more embodiments of the present specification provide a storage medium. The storage medium is configured to store computer-executable instructions. The computer-executable instructions implement the following procedure when being executed by a processor: receiving a data processing request sent by a first user, where the data processing request includes first original data to be processed; invoking a first smart contract deployed in a blockchain network, and extracting a feature value of the first original data based on the first smart contract; matching historical data saved in the blockchain network based on the feature value so as to determine whether there is target historical data whose similarity with the first original data satisfies a predetermined condition in the historical data; and performing corresponding processing based on matching result information of the matching processing.

BRIEF DESCRIPTION OF DRAWINGS

To describe the technical solutions in the one or more embodiments of the present specification or in the existing technologies more clearly, the following is a brief introduction of the accompanying drawings needed for describing the embodiments or the existing technologies. Clearly, the accompanying drawings in the following description show merely some embodiments described in the present specification, and a person of ordinary skill in the art can still derive other drawings from these accompanying drawings without making innovative efforts.

DESCRIPTION OF EMBODIMENTS

To make a person skilled in the art better understand the technical solutions in the one or more embodiments of the present specification, the following clearly and completely describes the technical solutions in the one or more embodiments of the present specification with reference to the accompanying drawings in the one or more embodiments of the present specification. Clearly, the described embodiments are merely some but not all of the embodiments of the present specification. All other embodiments obtained by a person of ordinary skill in the art based on the one or more embodiments of the present specification without making innovative efforts shall fall within the protection scope of the present file.

Figure 1:
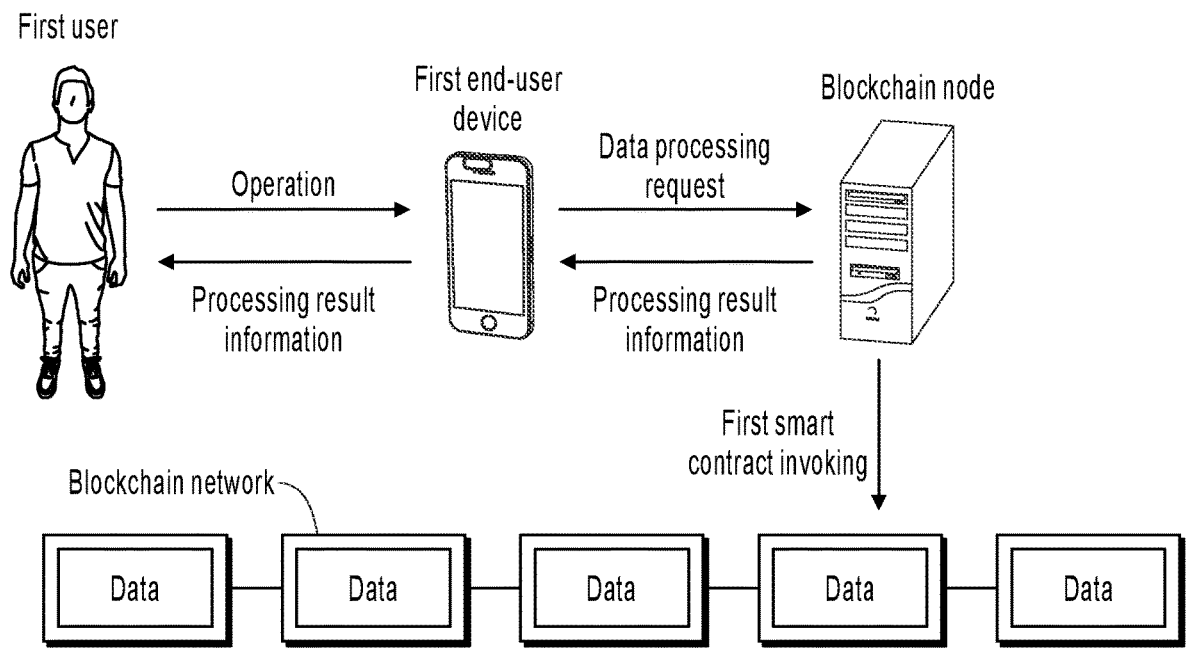
FIG. 1 is a first schematic scenario diagram illustrating a data processing method, according to one or more embodiments of the present specification.

FIG. 1 is a first schematic scenario diagram illustrating a data processing method according to one or more embodiments of the present specification. As shown in FIG. 1, the scenario includes: a first end-user device of a first user and at least one blockchain node accessing a blockchain network (only one blockchain node is shown in FIG. 1), where the first end-user device can be a mobile phone, a tablet computer, a desktop computer, a portable notebook computer, etc. (only the mobile phone is shown in FIG. 1). Data, such as work data uploaded by a user, is saved in the blockchain network, where the work data is data such as text works, video works, photographic works, and computer software.

Specifically, the first user operates the first end-user device of the first user to send a data processing request to the blockchain node; the blockchain node invokes a first smart contract deployed in the blockchain network, obtains first original data to be processed from the data processing request based on the first smart contract, and extracts a feature value of the first original data; matches historical data saved in the blockchain network based on the extracted feature value so as to determine whether there is target historical data whose similarity with the first original data satisfies a predetermined condition in the historical data saved in the blockchain network, performs corresponding processing based on matching result information of the matching processing, and sends processing result information to the first end-user device; and the first end-user device displays the received processing result information. The data processing request is, for example, a data request or a retrieval request. The first original data is data such as original text works, video works, photographic works, and computer software.

Figure 2:
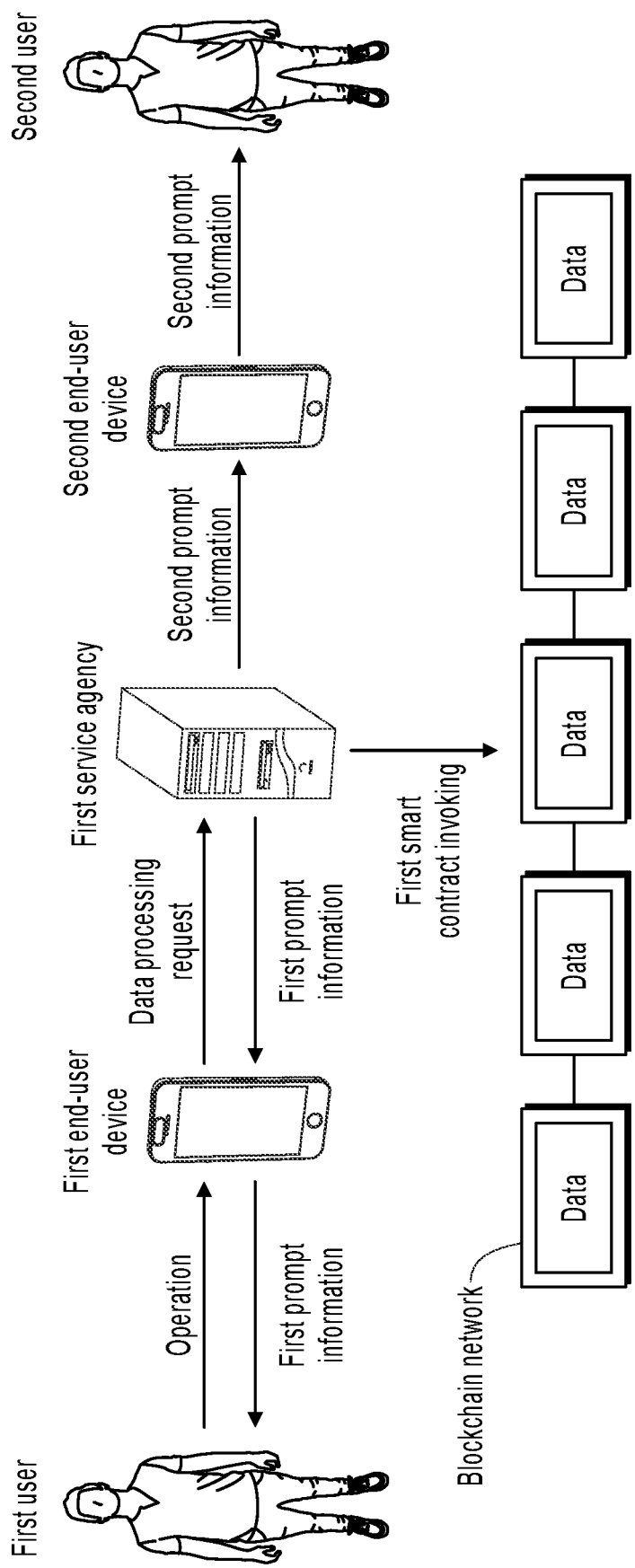
FIG. 2 is a second schematic scenario diagram illustrating a data processing method, according to one or more embodiments of the present specification.

Further, when the data processing request is a data preservation request, as shown in FIG. 2, the scenario can further include: a second end-user device of a second user corresponding to the target historical data, where the second end-user device can be a mobile phone, a tablet computer, a desktop computer, a portable notebook computer, etc. (only the mobile phone is shown in FIG. 2). When determining that target historical data exists, the blockchain node sends first prompt information of similar data to the first end-user device and sends second prompt information of similar data to the second end-user device respectively. The first end-user device displays the received first prompt information, and the second end-user device displays the received second prompt information.

Therefore, work data of a user is saved in a blockchain network, and matching processing is performed based on historical data saved in the blockchain network when a data processing request is received to ensure that the data saved in the blockchain cannot be tampered with, and the accuracy of a matching result is further guaranteed. Moreover, based on the characteristics of the blockchain network, the problems such as unreliable matching results caused by attack are avoided. Meanwhile, a feature value is extracted and matching processing is performed based on the feature value so that it is difficult for the works to escape from infringement determination even if the user makes simple modification to the works, and therefore the accuracy of the matching result is improved. Moreover, the feature value is extracted based on a smart contract so that an extraction rule for the feature value is traceable and can be upgraded and optimized, thereby continuously improving the extraction performance of the feature value, and also continuously improving the accuracy of the matching result.

Figure 3:
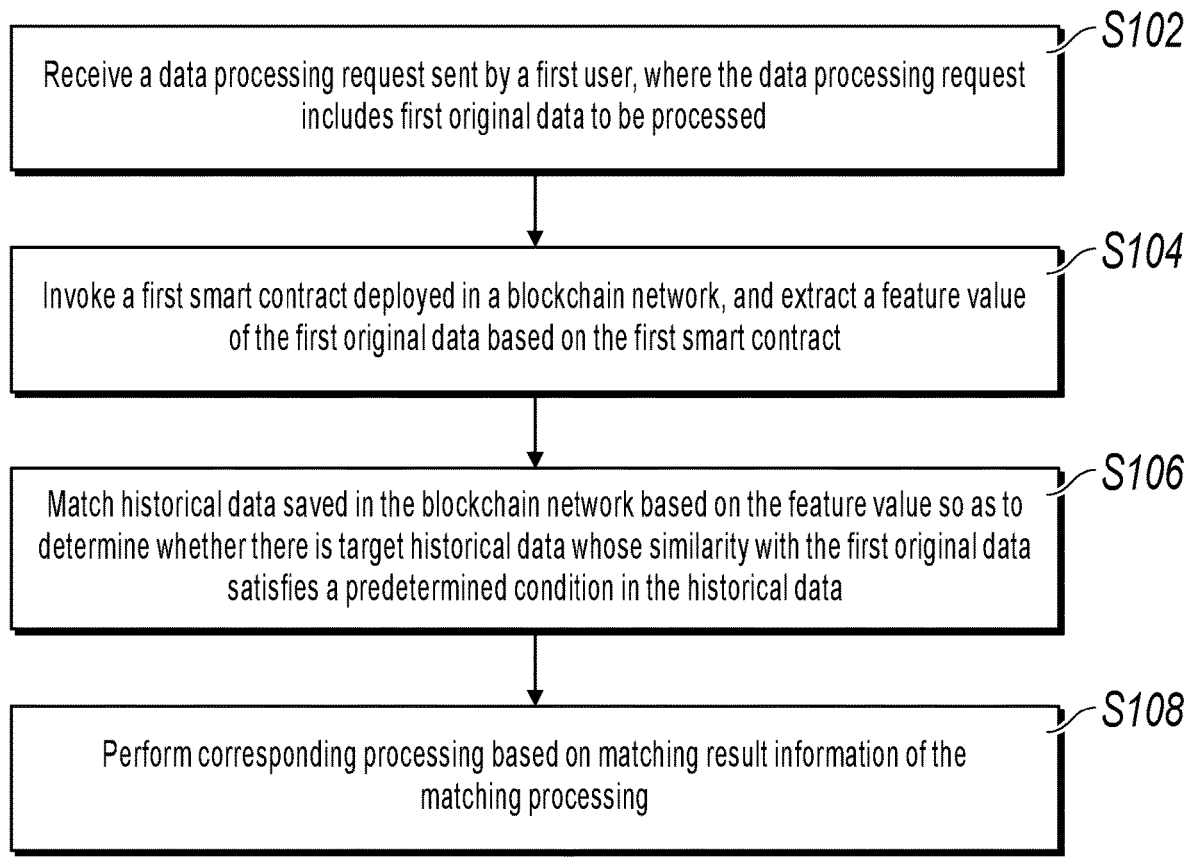
FIG. 3 is a first schematic flowchart illustrating a data processing method, according to one or more embodiments of the present specification.

Based on the previously described application scenario architecture, one or more embodiments of the present specification provide a data processing method. FIG. 3 is a first schematic flowchart illustrating a data processing method according to one or more embodiments of the present specification. The method in FIG. 3 can be performed by the blockchain node in FIG. 1. As shown in FIG. 3, the method includes the following steps:

S102. A data processing request sent by a first user is received, where the data processing request includes first original data to be processed.

The first original data to be processed includes work data, such as text works, video works, photographic works, and computer software. It is worthwhile to note that the first original data to be processed is not limited to work data, data having duplicate judgment needs can fall within the protection scope of the present file.

S104. A first smart contract deployed in a blockchain network is invoked, and a feature value of the first original data is extracted based on the first smart contract.

S106. Historical data saved in the blockchain network is matched based on the feature value so as to determine whether there is target historical data whose similarity with the first original data satisfies a predetermined condition in the historical data.

S108. Corresponding processing is performed based on matching result information of the matching processing.

In one or more embodiments of the present specification, when a blockchain node receives a data processing request, a feature value of first original data in the data processing request is extracted based on a first smart contract in a blockchain network, historical data saved in the blockchain network is matched based on the extracted feature value so as to determine whether there is target historical data whose similarity with the first original data satisfies a predetermined condition in the historical data, and corresponding processing is performed based on matching result information of the matching processing. Therefore, work data of a user is saved in a blockchain network, and matching processing is performed based on historical data saved in the blockchain network when a data processing request is received to ensure that the data saved in the blockchain cannot be tampered with, and the accuracy of a matching result is further guaranteed. Moreover, based on the characteristics of the blockchain network, the problems such as unreliable matching results caused by attack are avoided. Meanwhile, a feature value is extracted and matching processing is performed based on the feature value so that it is difficult for the works to escape from infringement determination even if the user makes simple modification to the works, and therefore the accuracy of the matching result is improved. Moreover, the feature value is extracted based on a smart contract so that an extraction rule for the feature value is traceable and can be upgraded and optimized, thereby continuously improving the extraction performance of the feature value, and also continuously improving the accuracy of the matching result.

Figure 4:
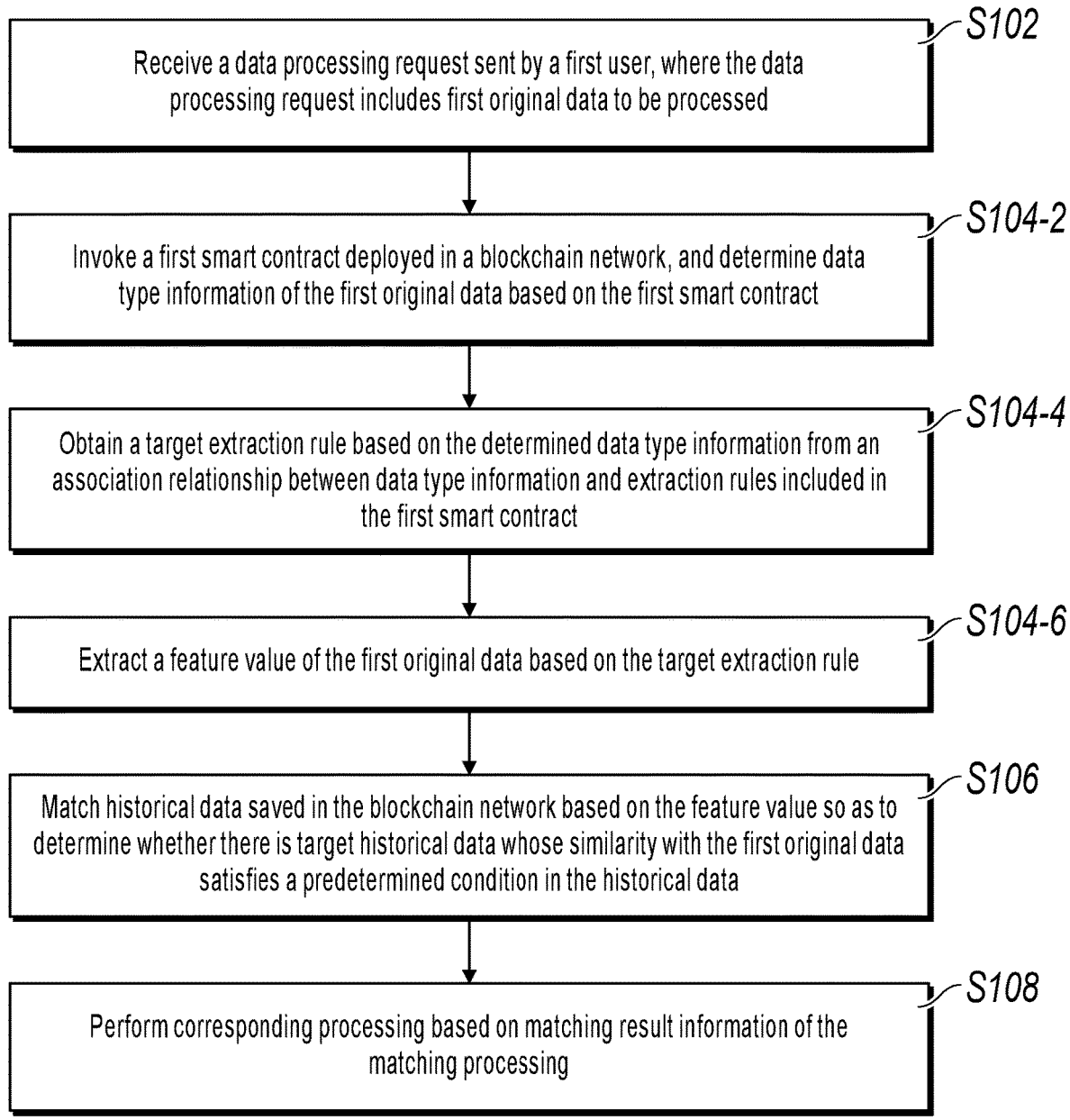
FIG. 4 is a second schematic flowchart illustrating a data processing method, according to one or more embodiments of the present specification.

In view of that extraction rules for feature values are often different for different types of data, to quickly determine a target extraction rule when a data processing request is received, in one or more embodiments of the present specification, an association relationship between data type information and extraction rules is predetermined. Specifically, as shown in FIG. 4, S104 can include S104-2 to S104-6 as follows:

S104-2. A first smart contract deployed in a blockchain network is invoked, and data type information of the first original data is determined based on the first smart contract.

Optionally, a type identification method for a data type is predetermined in the first smart contract. Correspondingly, S104-2 includes the following: the first original data is identified by using the predetermined type identification method based on the first smart contract to obtain data type information of the first original data. The type identification method can be set based on actual needs, which is not specifically limited in the present specification. Or, the first user can specify data type information of the first original data when sending a data processing request. Correspondingly, S104-2 includes the following: data type information of the first original data is obtained from the data processing request based on the first smart contract.

S104-4. A target extraction rule is obtained, based on the determined data type information, from an association relationship between data type information and extraction rules included in the first smart contract.

The extraction rule for feature values can use any existing extraction rule for feature values, and can be set based on actual needs. As an example, when the data type information is a text type, the target extraction rule is term frequency-inverse document frequency (TF-IDF). When the data type is an image type, the target extraction rule is scale-invariant feature transform (SIFT) speeded up robust features (SURF), etc. When the data type is a video type, each frame image or key frame image of video data can be obtained, and feature values, etc. are extracted for each obtained frame image or key frame image based on the target extraction rule corresponding to the image type.

S104-6. A feature value of the first original data is extracted based on the target extraction rule.

Because each extraction rule in the previously described examples is a well-known technical method to a person skilled in the art, for a specific process of extracting a feature value based on a target extraction rule, details are omitted here for simplicity.

An association relationship between data type information and extraction rules is set in the first smart contract, thus the target extraction rule can be quickly determined based on the association relationship when the data processing request is received, and the extraction rate of the feature value is further improved.

Figure 5:
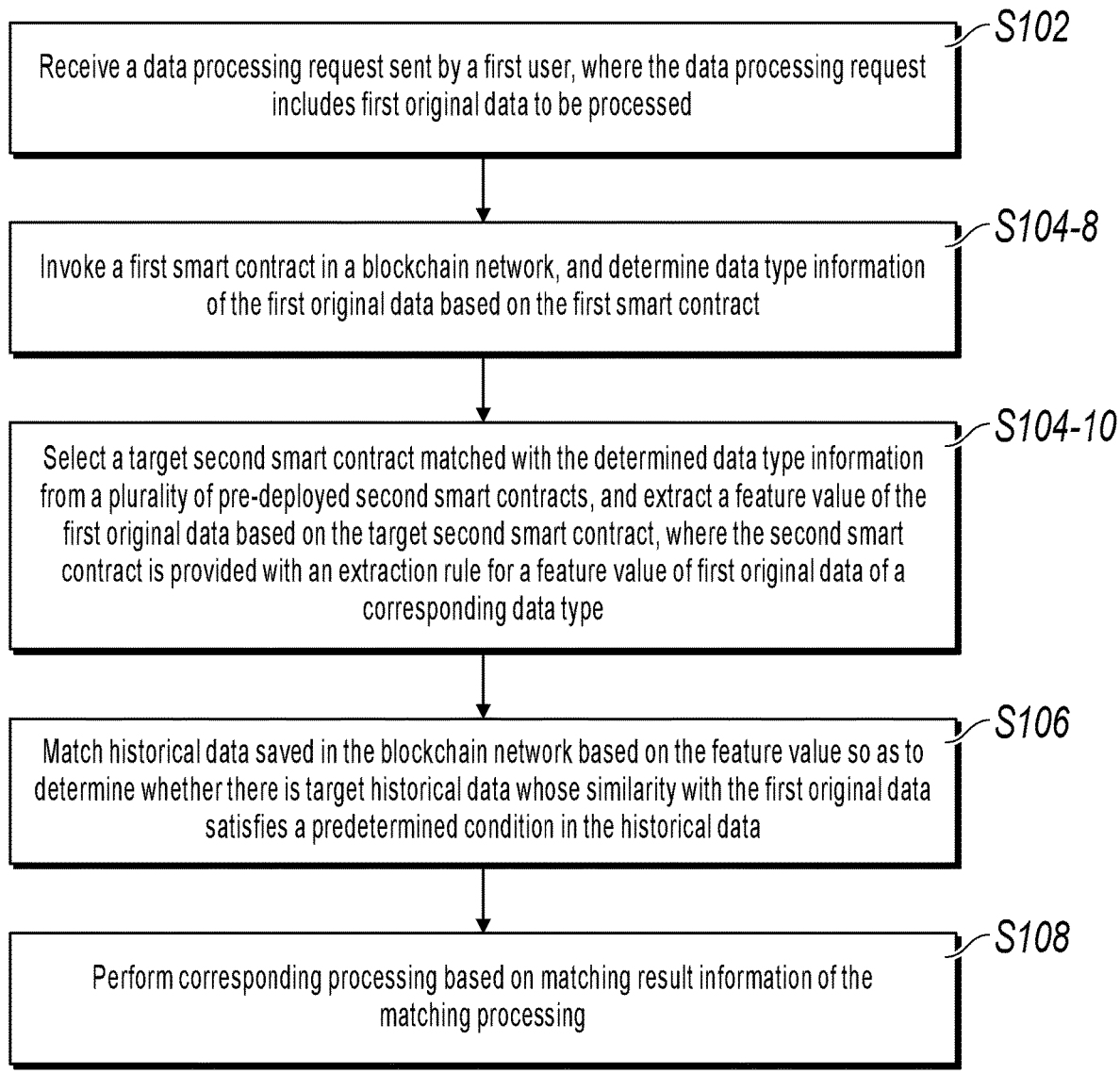
FIG. 5 is a third schematic flowchart illustrating a data processing method, according to one or more embodiments of the present specification.

Further, to ensure that each blockchain node can perform feature value extraction on the same type of first original data based on the same extraction rule, in one or more embodiments of the present specification, a plurality of second smart contracts can further be deployed in the blockchain network, and each second smart contract includes a feature value extraction rule for data of one data type. Correspondingly, as shown in FIG. 5, S104 can include S104-8 to S104-10 as follows:

S104-8. A first smart contract in a blockchain network is invoked, and data type information of the first original data is determined based on the first smart contract.

The implementation of the present step is the same as that of S104-2. References can be made to the previously described description. Repetitions are omitted here for simplicity.

S104-10. A target second smart contract matched with the determined data type information is selected from a plurality of pre-deployed second smart contracts, and a feature value of the first original data is extracted based on the target second smart contract, where the second smart contract is provided with an extraction rule for a feature value of first original data of a corresponding data type.

Specifically, associated target contract identification information is obtained from a predetermined association relationship between data type information and contract identification information based on the determined data type information, and a second smart contract corresponding to the obtained target contract identification information is used as a target second smart contract matched with the determined data type information. The target second smart contract is invoked, and a feature value of the first original data is extracted based on the target second smart contract.

Therefore, a second smart contract is deployed, and an extraction rule for a feature value of the first original data of a corresponding data type is set in the second smart contract, so that different blockchain nodes extract the feature values of the first original data of the same type by using the same second smart contract, thereby not only facilitating management and upgrade of the extraction rules, but also ensuring that the blockchain nodes have the same feature value extraction rules. Therefore, the uniqueness of the feature value extracted from the same first original data is ensured, and the credibility of a matching result is improved.

In view of that the data volume of historical data saved in the blockchain network is often high, to improve the matching efficiency, in one or more embodiments of the present specification, fuzzy search is firstly performed based on the feature value to obtain candidate historical data, and target historical data is then determined from the candidate historical data based on an accurate similarity calculation method. Specifically, as shown in FIG. 6, S106 includes S106-2 as follows:

S106-2. Fuzzy search processing is performed on the feature value of the first original data and a feature value of historical data saved in the blockchain network so as to determine whether there is target historical data whose similarity with the first original data satisfies a predetermined condition in the historical data.

Optionally, when the historical data and the feature value are saved in the blockchain network, the historical data, the feature value of the historical data, user information (such as user identifier, name, and age) of a second user corresponding to the historical data are associatively recorded, and the recorded information is saved in the blockchain network. Correspondingly, S106-2 includes the following: fuzzy search processing is performed on the feature value of the first original data and a feature value associated with historical data saved in the blockchain network so as to obtain a target feature value, and historical data associated with the target feature value is determined as candidate historical data satisfying a first predetermined condition. Or, when the historical data and the feature value of the historical data are saved in the blockchain network, the historical data and user information of a second user corresponding to the historical data are associatively saved in the blockchain network first, then the feature value of the historical data and a storage address of the historical data are associatively recorded, and the recorded information is saved in a specified storage area in the blockchain network. The specified storage area includes an association relationship between feature values of each historical data and storage addresses. Correspondingly, S106-2 includes the following: fuzzy search processing is performed on the feature value of the first original data and a feature value in the specified storage area in the blockchain network so as to obtain a target feature value, and historical data corresponding to the storage address associated with the target feature value is determined as candidate historical data satisfying a first predetermined condition.

Figure 6:
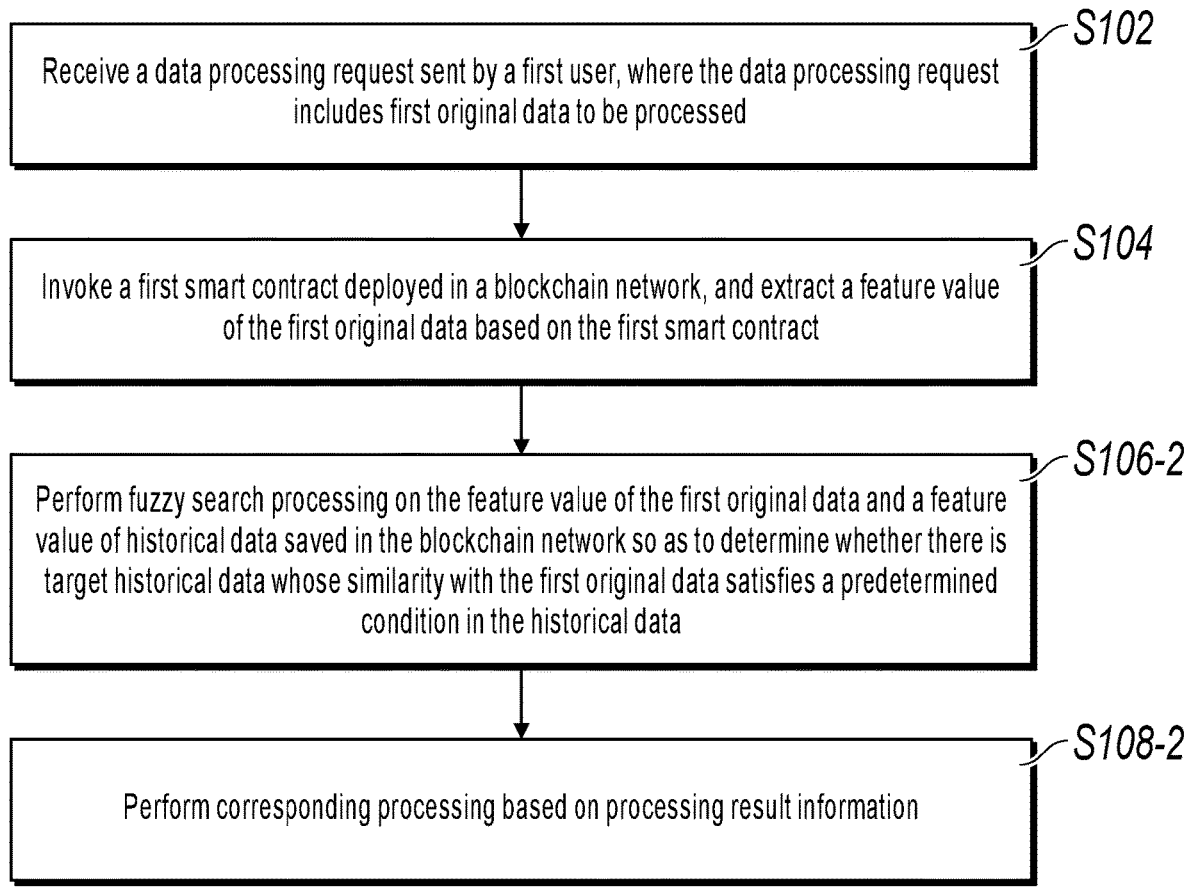
FIG. 6 is a fourth schematic flowchart illustrating a data processing method, according to one or more embodiments of the present specification.

Corresponding to S106-2, as shown in FIG. 6, S108 includes S108-2 as follows:

S108-2. Corresponding processing is performed based on processing result information.

Figure 7:
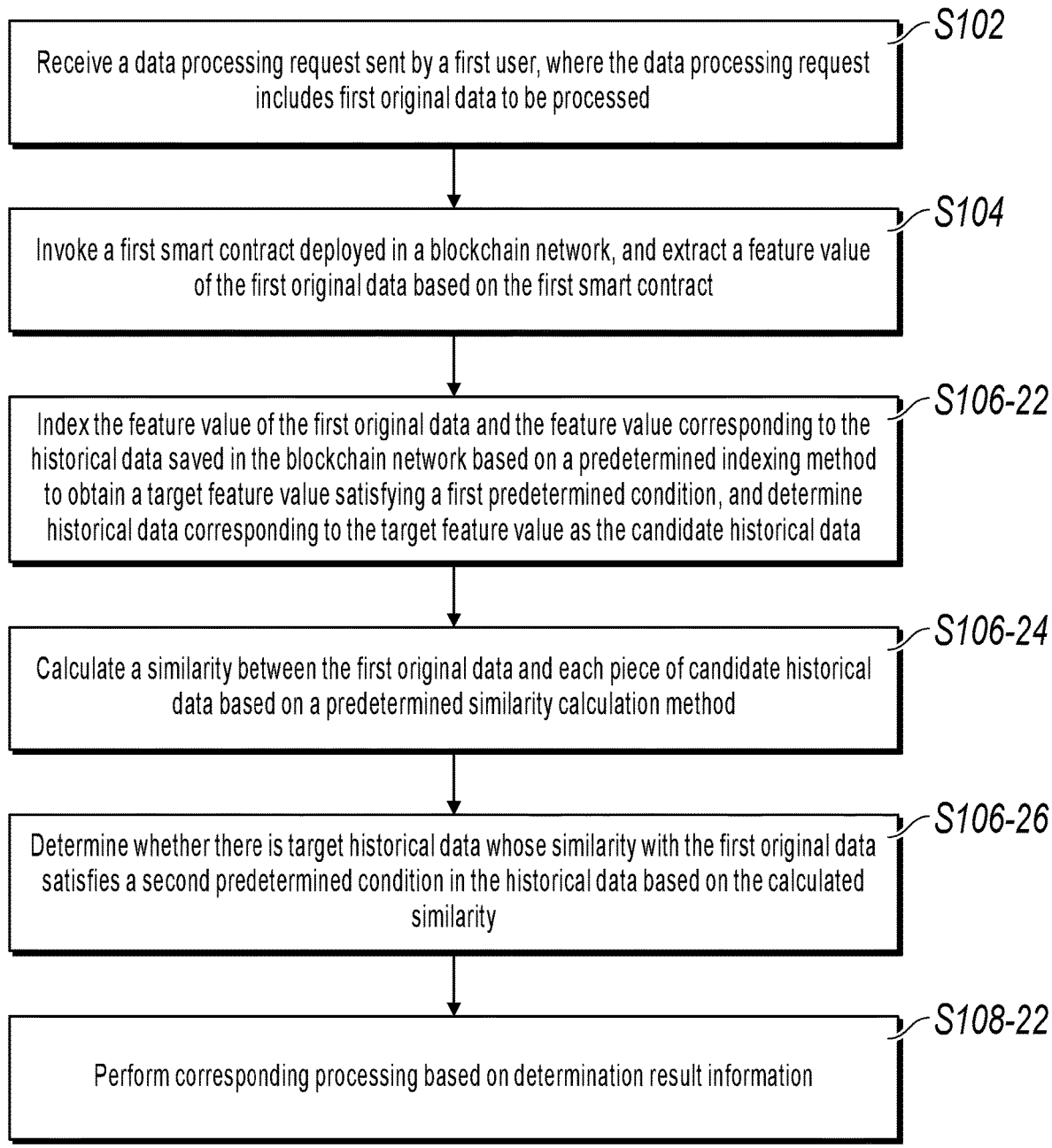
FIG. 7 is a fifth schematic flowchart illustrating a data processing method, according to one or more embodiments of the present specification.

Further, to satisfy data processing needs of a high throughput, in one or more embodiments of the present specification, an indexing method that does not involve an issue of tampering and has a processing speed at a millisecond level is predetermined. Correspondingly, as shown in FIG. 7, S106-2 can include S106-22 to S106-26 as follows:

S106-22. The feature value of the first original data and the feature value corresponding to the historical data saved in the blockchain network are indexed based on a predetermined indexing method to obtain a target feature value satisfying a first predetermined condition, and historical data corresponding to the target feature value is determined as the candidate historical data.

The target feature value satisfying the first predetermined condition can be the first N feature values that are ranked in a descending order based on a similarity with the feature value of the first original data, or can be the last N feature values that are ranked in an ascending order based on a similarity with the feature value of the first original data. N is greater than or equal to 1, and can specifically be set based on actual needs. For example, N is 5. Further, the indexing method is, for example, text word segmentation, inverted indexing, or word vector indexing. It is worthwhile to note that the indexing method is not limited to the previously described method, but can also be set based on actual needs. Because the indexing method is a technical method well known to a person skilled in the art, details of a specific indexing process are omitted in the present specification for simplicity. Preliminary screening is performed by using the indexing method based on the feature value so that candidate historical data can be quickly obtained, and therefore target historical data is determined based on an accurate similarity calculation method.

S106-24. A similarity between the first original data and each piece of candidate historical data is calculated based on a predetermined similarity calculation method.

Different similarity calculation methods can be used for first original data of different data types. For example, for data in a text form, word vector similarity, deep learning grammar book similarity, etc. are used. For image data, cosine similarity, histogram similarity, machine learning, etc. are used. For video data, similarity calculation can be performed for each frame of image data or key frame images. It is worthwhile to note that the similarity calculation method is not limited to the previously described methods, but can be set based on actual needs.

S106-26. It is determined whether there is target historical data whose similarity with the first original data satisfies a second predetermined condition in the historical data based on the calculated similarity.

The target historical data satisfying the second predetermined condition can be the first M historical data ranked in a descending order based on a similarity, or can be the last M historical data ranked in an ascending order based on a similarity. M is greater than or equal to 1, and can be set based on actual needs. For example, M is 3. Or, the target historical data satisfying the second predetermined condition can be historical data whose similarity with the first original data is greater than a predetermined similarity threshold. It is worthwhile to note that the target historical data may not exist when the target historical data satisfying the second predetermined condition can be historical data whose similarity with the first original data is greater than a predetermined similarity threshold.

Further, corresponding to S106-22 to S106-26 previously described, as shown in FIG. 7, S108 can include S108-22 as follows:

S108-22. Corresponding processing is performed based on determination result information.

Therefore, firstly, fuzzy search is performed by using a predetermined indexing method based on the feature value, instead of directly calculating the similarity between the first original data and each piece of historical data one by one based on a relatively complex similarity calculation method, therefore candidate historical data can be quickly obtained. The similarity between the first original data and each piece of candidate historical data can be further calculated based on an accurate similarity calculation method to obtain target historical data. Therefore, on the basis of ensuring the accuracy of the target historical data, the determination rate of the target historical data is greatly improved, and high-throughput data processing needs can be satisfied.

It is worthwhile to note that for the specific implementations of S108-2 and S108-22 previously described, references can be made to the following related description of S108. Details are omitted here for simplicity.

In practice, some users choose to save work data directly in a blockchain network to avoid loss or malicious tampering after work creation is completed. Correspondingly, the data processing request is a data preservation request. Specifically, as shown in FIG. 8, S102 can include S102-2 as follows:

S102-2. A data preservation request sent by a first user is received, where the data preservation request includes first original data to be preserved.

Figure 8:
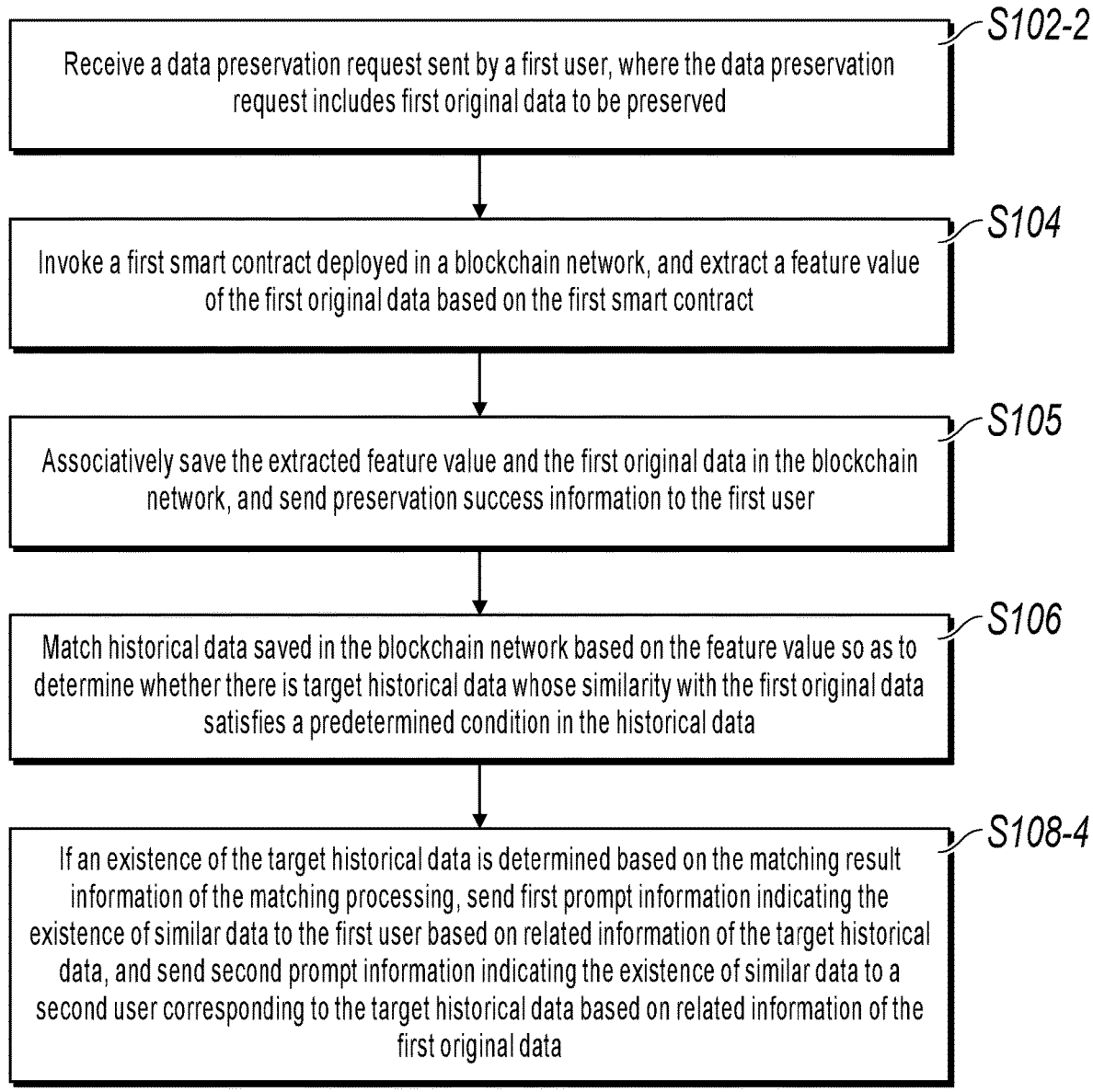
FIG. 8 is a sixth schematic flowchart illustrating a data processing method, according to one or more embodiments of the present specification.

Corresponding to S102-2, as shown in FIG. 8, after S104, the method can further include S105 as follows:

S105. The extracted feature value and the first original data are associatively saved in the blockchain network, and preservation success information is sent to the first user.

Optionally, the extracted feature value, the first original data, the user information of the first user, etc. are associatively recorded, and the recorded information is saved in the blockchain network. Or, the first original data, the user information of the first user, etc. are associatively saved in the blockchain network, the storage address of the first original data and the feature value are associatively recorded, and the recorded information is saved in a specified storage area of the blockchain network, where the specified storage area includes an association relationship between a storage address of each piece of historical data and a feature value. Therefore, when a data processing request is subsequently received, corresponding processing can be performed based on the association relationship in the specified storage area.

Further, in view of that when target historical data exist, there is an infringement risk that the first user infringes the right of a second user corresponding to the target historical data, to enable the first user to know the infringement risk in time and enable the second user to maintain the right of the second user in time, in one or more embodiments of the present specification, corresponding to S102-2 and S105, as shown in FIG. 8, S108 can include S108-4 as follows:

S108-4. If an existence of the target historical data is determined based on the matching result information of the matching processing, first prompt information indicating the existence of similar data is sent to the first user based on related information of the target historical data, and second prompt information indicating the existence of similar data is sent to a second user corresponding to the target historical data based on related information of the first original data.

In order to ensure the privacy of data, related information of the target historical data is, for example, a feature value of the target historical data and user information of the corresponding second user. When the target history data is published in the network, the related information of the target historical data can also be a link address of the target historical data, etc. The related information of the first original data is, for example, the feature value of the first original data, the user information of the first user, etc. The user information is, for example, name and age.

Further, if it is determined based on the matching result information of the matching processing that there's no target historical data, third prompt information indicating that there is no similar data can be sent to the first user, so that the first user determines that the first original data does not have the risk of infringement; or, no information is needed to send to the first user.

Therefore, when a data preservation request is received, the first original data to be preserved and the feature value of the first original data are saved in the blockchain network, to ensure that the data saved in the blockchain cannot be tampered with, and an effective basis is provided for subsequent data processing requests. Moreover, when the existence of the target historical data is determined, prompt information is sent to the first user and the second user so that the first user can modify the works of the first user in time, and infringement is voided. The second user can be aware of the risk of copyright infringement, and take timely measures to protect the rights and interests of the second user.

When the first user receives the first prompt information, the first original data of the first user can be modified based on the related information of the target historical data included in the first prompt information to obtain second original data, and another data preservation request is sent to the blockchain node based on the second original data.

Figure 9:
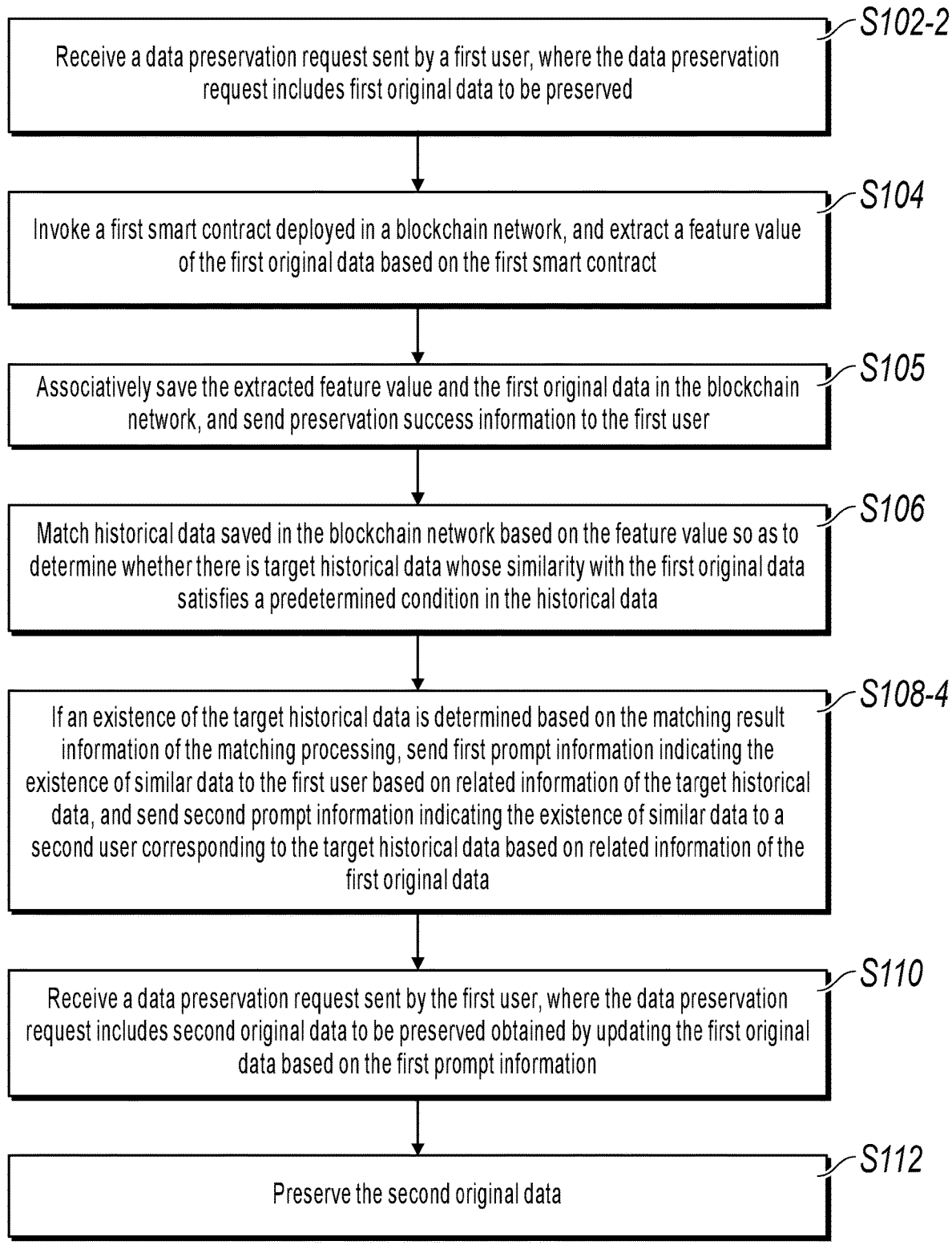
FIG. 9 is a seventh schematic flowchart illustrating a data processing method, according to one or more embodiments of the present specification.

Correspondingly, as shown in FIG. 9, after S108-4, the method can further include the following:

S110. The data preservation request sent by the first user is received, where the data preservation request includes second original data to be preserved obtained by updating the first original data based on the first prompt information.

S112. The second original data is preserved.

Specifically, to enable the blockchain node to distinguish whether data to be preserved is initial-version data or updated data, in one or more embodiments of the present specification, the data preservation request can further include version information, data identification information, etc. of the data to be preserved, and modified data is the same as the data identification information of data of the previous version. Correspondingly, when the data to be preserved is saved in the blockchain network, the data to be preserved, version information and data identification information of the data to be preserved, etc. are associatively saved in the blockchain network. Therefore, in S112, the blockchain node obtains version information of second original data to be preserved from the data preservation request, determines other data other than data related to the second original data in the blockchain network as historical data if it is determined that the obtained version information is not predetermined initial version information, and returns to S104 to perform feature value extraction and matching of the historical data based on the feature values, etc, where for specific processes of extracting the feature value and matching the historical data, etc., references can be made to the previously described related description. Repetitions are omitted here for simplicity. Optionally, the version information is arranged in a sequentially increasing way, such as V1.0, V1.1, and V1.2. The data related to the second original data, for example, has the same data identification information as the second original data, and adopts the previous versions of the second original data. As an example, if the version of the second original data is V1.2 and the data identification information is 0003, the related data of the second original data includes data having data identification information of 0003 and versions of V1.0 and V1.1. It is worthwhile to note that when the historical data saved in the blockchain network has a plurality of versions, the data of the last version is determined as the final data of the corresponding second user.

Further, when the data processing request is a data preservation request, after the blockchain node extracts the features of the first original data, S105 is performed, and meanwhile, S106 can be performed silently at the back end. Therefore, the storage operation and the matching operation are performed in parallel, and the processing efficiency can be improved.

Figure 10:
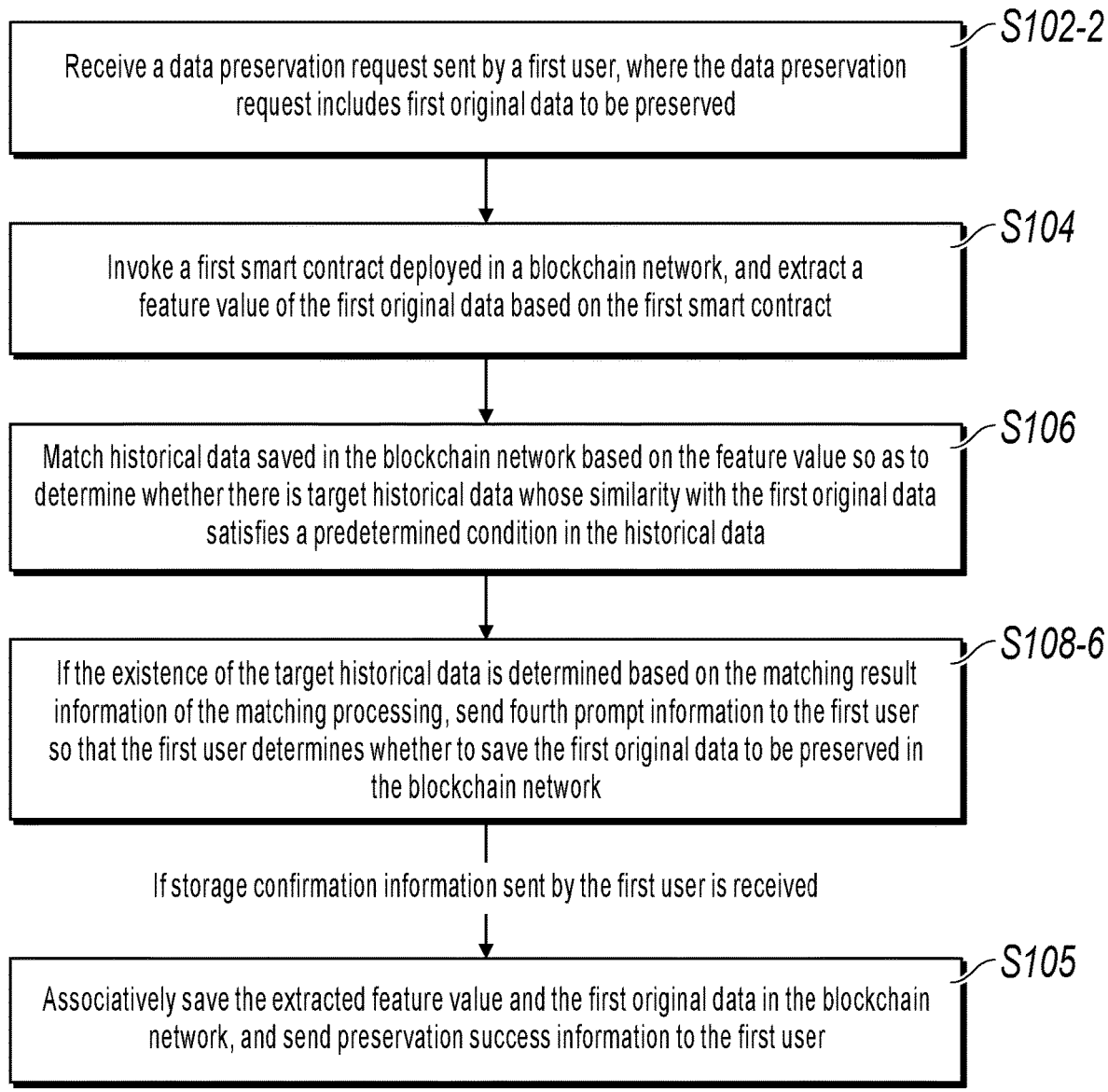
FIG. 10 is an eighth schematic flowchart illustrating a data processing method, according to one or more embodiments of the present specification.

Further, when the data processing request is a data preservation request, S105 can further be performed after S108. That is, after extracting the features of the first original data, the blockchain node can further firstly match the historical data saved in the blockchain network based on the extracted feature value to determine whether there is target historical data whose similarity with the first original data satisfies a predetermined condition in the historical data; and prompt information is sent to the first user when the existence of the target historical data is determined, and S105 is performed when storage determination information sent by the first user is received. Specifically, as shown in FIG. 10, S108 can include S108-6 as follows:

S108-6. If the existence of the target historical data is determined based on the matching result information of the matching processing, fourth prompt information is sent to the first user, so that the first user determines whether to save the first original data to be preserved in the blockchain network. If storage confirmation information sent by the first user is received, S105 is performed.

The fourth prompt information and the first prompt information can be the same or different. Therefore, if the existence of the target historical data is determined, third prompt information is sent to the first user before the first original data to be preserved is saved in the blockchain network, so that the first user can determine whether to save the first original data to be preserved in the blockchain network, and the occurrence of an infringement event can be effectively avoided.

Further, if the absence of target historical data is determined based on the matching result information of the matching processing, S105 is performed, and third prompt information representing the absence of similar data can be sent to the first user, so that the first user determines that the first original data does not have the risk of infringement; or, S105 is performed.

In practice, some users have query needs for similar works in the process of creating works so as to avoid creating similar works. Based on this, in one or more embodiments of the present specification, the data processing request can further be a retrieval request. Correspondingly, as shown in FIG. 11, S102 includes S102-4 as follows:

S102-4. A retrieval request sent by a first user is received, where the retrieval request includes first original data to be queried.

Figure 11:
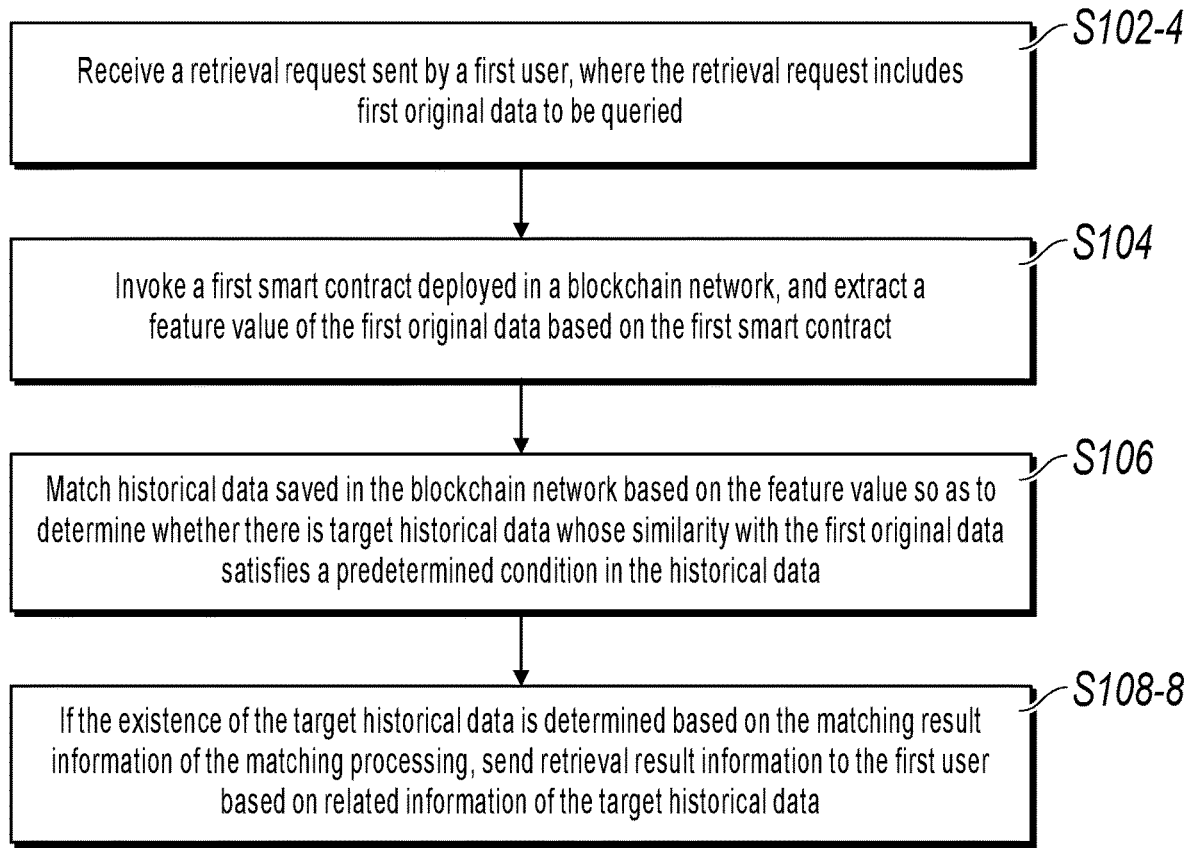
FIG. 11 is a ninth schematic flowchart illustrating a data processing method, according to one or more embodiments of the present specification.

Corresponding to S102-4, as shown in FIG. 11, S108 can include S108-8 as follows:

S108-8. If the existence of the target historical data is determined based on the matching result information of the matching processing, retrieval result information is sent to the first user based on related information of the target historical data.

Further, if the absence of target historical data is determined based on the matching result information of the matching processing, retrieval result information representing the absence of similar data is sent to the first user.

Therefore, when the received data processing request is a retrieval request, the retrieval result information is sent to the first user based on the matching result information of the matching processing, so that the first user can avoid an infringement risk when creating works.

Further, the first user can further specify a target reference file similar to the first original data, and the target reference file can be historical data saved in the blockchain network or other data not saved in the blockchain network. Correspondingly, the data processing request further includes related information of the target reference file. When the blockchain node determines candidate historical data based on the data processing request, the target reference file is also determined as the candidate historical data, and the similarity between the first original data and each piece of candidate historical data is calculated based on a predetermined similarity calculation method.

In one or more embodiments of the present specification, when a blockchain node receives a data processing request, a feature value of first original data in the data processing request is extracted based on a first smart contract in a blockchain network, historical data saved in the blockchain network is matched based on the extracted feature value so as to determine whether there is target historical data whose similarity with the first original data satisfies a predetermined condition in the historical data, and corresponding processing is performed based on matching result information of the matching processing. Therefore, work data of a user is saved in a blockchain network, and matching processing is performed based on historical data saved in the blockchain network when a data processing request is received to ensure that the data saved in the blockchain cannot be tampered with, and the accuracy of a matching result is further guaranteed. Moreover, based on the characteristics of the blockchain network, the problems such as unreliable matching results caused by attack are avoided. Meanwhile, a feature value is extracted and matching processing is performed based on the feature value so that it is difficult for the works to escape from infringement determination even if the user makes simple modification to the works, and therefore the accuracy of the matching result is improved. Moreover, the feature value is extracted based on a smart contract so that an extraction rule for the feature value is traceable and can be upgraded and optimized, thereby continuously improving the extraction performance of the feature value, and also continuously improving the accuracy of the matching result.

Figure 12:
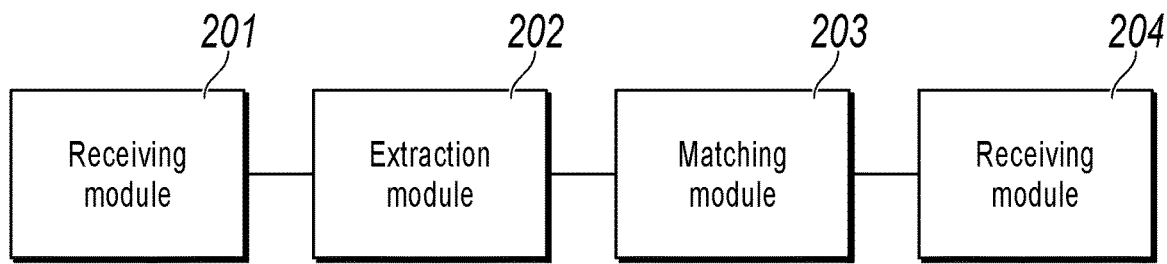
FIG. 12 is a schematic diagram illustrating module composition of a data processing apparatus, according to one or more embodiments of the present specification.

Corresponding to the data processing method described previously in FIG. 3 to FIG. 11, one or more embodiments of the present specification further provide a data processing apparatus based on the same technical concept. FIG. 12 is a schematic diagram illustrating module composition of a data processing apparatus according to one or more embodiments of the present specification. The apparatus is configured to perform the data processing method described in FIG. 3 to FIG. 11. As shown in FIG. 12, the apparatus includes:

a receiving module 201, configured to receive a data processing request sent by a first user, where the data processing request includes first original data to be processed;

an extraction module 202, configured to invoke a first smart contract deployed in a blockchain network and extract a feature value of the first original data based on the first smart contract;

a matching module 203, configured to match historical data saved in the blockchain network based on the feature value so as to determine whether there is target historical data whose similarity with the first original data satisfies a predetermined condition in the historical data; and a processing module 204, configured to perform corresponding processing based on matching result information of the matching processing.

In the data processing apparatus according to one or more embodiments of the present specification, when a blockchain node receives a data processing request, a feature value of first original data in the data processing request is extracted based on a first smart contract in a blockchain network, historical data saved in the blockchain network is matched based on the extracted feature value so as to determine whether there is target historical data whose similarity with the first original data satisfies a predetermined condition in the historical data, and corresponding processing is performed based on matching result information of the matching processing. Therefore, work data of a user is saved in a blockchain network, and matching processing is performed based on historical data saved in the blockchain network when a data processing request is received to ensure that the data saved in the blockchain cannot be tampered with, and the accuracy of a matching result is further guaranteed. Moreover, based on the characteristics of the blockchain network, the problems such as unreliable matching results caused by attack are avoided. Meanwhile, a feature value is extracted and matching processing is performed based on the feature value so that it is difficult for the works to escape from infringement determination even if the user makes simple modification to the works, and therefore the accuracy of the matching result is improved. Moreover, the feature value is extracted based on a smart contract so that an extraction rule for the feature value is traceable and can be upgraded and optimized, thereby continuously improving the extraction performance of the feature value, and also continuously improving the accuracy of the matching result.

Optionally, the extraction module 202 is configured to: determine data type information of the first original data based on the first smart contract; and select a target second smart contract matched with the data type information from a plurality of pre-deployed second smart contracts, and extract a feature value of the first original data based on the target second smart contract, where the second smart contract is provided with an extraction rule for a feature value of first original data of a corresponding data type.

Optionally, the matching module 203 is configured to: perform fuzzy search processing on the feature value of the first original data and a feature value of historical data saved in the blockchain network so as to obtain candidate historical data satisfying a first predetermined condition from the historical data; calculate a similarity between the first original data and each piece of the candidate historical data based on a predetermined similarity calculation method; and determine whether there is target historical data whose similarity with the first original data satisfies a second predetermined condition in the historical data based on the calculated similarity.

Optionally, the data processing request includes a data preservation request. The apparatus further includes a storage module.

The storage module is configured to associatively save the feature value and the first original data in the blockchain network and send preservation success information to the first user after the extraction module 202 extracts a feature value of the first original data based on the first smart contract.

Optionally, the processing module 204 is configured to: if the existence of the target historical data is determined based on the matching result information of the matching processing, send first prompt information indicating the existence of similar data to the first user based on related information of the target historical data, and send second prompt information indicating the existence of similar data to a second user corresponding to the target historical data based on related information of the first original data.

Optionally, the receiving module 201 is further configured to: receive the data preservation request sent by the first user, where the data preservation request includes second original data to be preserved obtained by updating the first original data based on the first prompt information; and preserve the second original data.

Optionally, the data processing request includes a retrieval request.

The processing module 204 is configured to: if the existence of the target historical data is determined based on the matching result information of the matching processing, send retrieval result information to the first user based on related information of the target historical data.

In the data processing apparatus according to one or more embodiments of the present specification, when a blockchain node receives a data processing request, a feature value of first original data in the data processing request is extracted based on a first smart contract in a blockchain network, historical data saved in the blockchain network is matched based on the extracted feature value so as to determine whether there is target historical data whose similarity with the first original data satisfies a predetermined condition in the historical data, and corresponding processing is performed based on matching result information of the matching processing. Therefore, work data of a user is saved in a blockchain network, and matching processing is performed based on historical data saved in the blockchain network when a data processing request is received to ensure that the data saved in the blockchain cannot be tampered with, and the accuracy of a matching result is further guaranteed. Moreover, based on the characteristics of the blockchain network, the problems such as unreliable matching results caused by attack are avoided. Meanwhile, a feature value is extracted and matching processing is performed based on the feature value so that it is difficult for the works to escape from infringement determination even if the user makes simple modification to the works, and therefore the accuracy of the matching result is improved. Moreover, the feature value is extracted based on a smart contract so that an extraction rule for the feature value is traceable and can be upgraded and optimized, thereby continuously improving the extraction performance of the feature value, and also continuously improving the accuracy of the matching result.

It is worthwhile to note that the embodiments of the present specification relating to the data processing apparatus are based on the same inventive concept as the embodiments of the present specification relating to the data processing method. Therefore, for specific implementations of the embodiments, references can be made to the implementations of the corresponding data processing method previously described. Repetitions are omitted here for simplicity.

Figure 13:
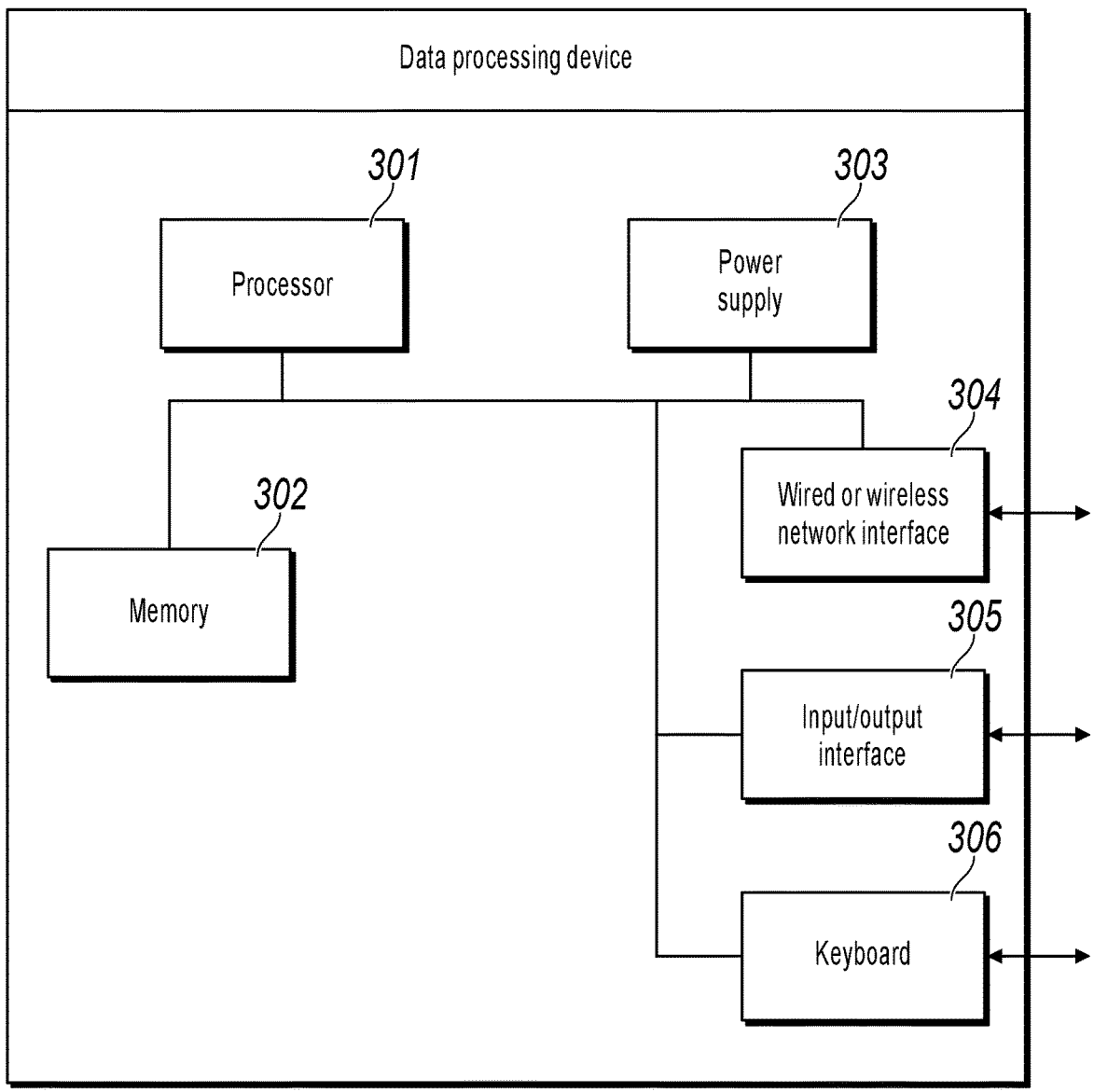
FIG. 13 is a schematic structural diagram illustrating a data processing device, according to one or more embodiments of the present specification.

Further, corresponding to the data processing method previously described, based on the same technical concept, one or more embodiments of the present specification further provide a data processing device. The device is configured to perform the data processing method previously described. FIG. 13 is a schematic structural diagram illustrating a data processing device according to one or more embodiments of the present specification.

As shown in FIG. 13, the data processing device can vary widely in configuration or performance and can include one or more processors 301 and a memory 302. The memory 302 can store one or more storage applications or data. The memory 302 can be a temporary storage or a persistent storage. The applications stored in the memory 302 can include one or more modules (not shown). Each module can include a series of computer-executable instructions in the data processing device. Still further, the processor 301 can be configured to communicate with the memory 302 to execute a series of computer-executable instructions in the memory 302 on the data processing device. The data processing device can further include one or more power supplies 303, one or more wired or wireless network interfaces 304, one or more input-output interfaces 305, one or more keyboards 306, etc.

In one or more specific embodiments, the data processing device includes a memory and one or more programs, where the one or more programs are stored in the memory, the one or more programs can include one or more modules, and each module can include a series of computer-executable instructions in the data processing device and is configured to execute, by the one or more processors, the one or more programs including computer-executable instructions for performing the following: receiving a data processing request sent by a first user, where the data processing request includes first original data to be processed; invoking a first smart contract deployed in a blockchain network, and extracting a feature value of the first original data based on the first smart contract; matching historical data saved in the blockchain network based on the feature value so as to determine whether there is target historical data whose similarity with the first original data satisfies a predetermined condition in the historical data; and performing corresponding processing based on matching result information of the matching processing.

In the data processing device according to one or more embodiments of the present specification, when a blockchain node receives a data processing request, a feature value of first original data in the data processing request is extracted based on a first smart contract in a blockchain network, historical data saved in the blockchain network is matched based on the extracted feature value so as to determine whether there is target historical data whose similarity with the first original data satisfies a predetermined condition in the historical data, and corresponding processing is performed based on matching result information of the matching processing. Therefore, work data of a user is saved in a blockchain network, and matching processing is performed based on historical data saved in the blockchain network when a data processing request is received to ensure that the data saved in the blockchain cannot be tampered with, and the accuracy of a matching result is further guaranteed. Moreover, based on the characteristics of the blockchain network, the problems such as unreliable matching results caused by attack are avoided. Meanwhile, a feature value is extracted and matching processing is performed based on the feature value so that it is difficult for the works to escape from infringement determination even if the user makes simple modification to the works, and therefore the accuracy of the matching result is improved. Moreover, the feature value is extracted based on a smart contract so that an extraction rule for the feature value is traceable and can be upgraded and optimized, thereby continuously improving the extraction performance of the feature value, and also continuously improving the accuracy of the matching result.

Optionally, when the computer-executable instructions are executed, the extracting a feature value of the first original data based on the first smart contract includes the following: determining data type information of the first original data based on the first smart contract; and selecting a target second smart contract matched with the data type information from a plurality of pre-deployed second smart contracts, and extracting a feature value of the first original data based on the target second smart contract, where the second smart contract is provided with an extraction rule for a feature value of first original data of a corresponding data type.

Optionally, when the computer-executable instructions are executed, the matching historical data saved in the blockchain network based on the feature value so as to determine whether there is target historical data whose similarity with the first original data satisfies a predetermined condition in the historical data includes the following: performing fuzzy search processing on the feature value of the first original data and a feature value of historical data saved in the blockchain network so as to obtain candidate historical data satisfying a first predetermined condition from the historical data; calculating a similarity between the first original data and each piece of the candidate historical data based on a predetermined similarity calculation method; and determining whether there is target historical data whose similarity with the first original data satisfies a second predetermined condition in the historical data based on the calculated similarity.

Optionally, when the computer-executable instructions are executed, the data processing request includes a data preservation request.

After the extracting a feature value of the first original data based on the first smart contract, the procedure further includes the following: associatively saving the feature value and the first original data in the blockchain network, and sending preservation success information to the first user.

Optionally, when the computer-executable instructions are executed, the data processing request includes a retrieval request.

The performing corresponding processing based on matching result information of the matching processing includes the following: if the existence of the target historical data is determined based on the matching result information of the matching processing, sending retrieval result information to the first user based on related information of the target historical data.

In the data processing device according to one or more embodiments of the present specification, when a blockchain node receives a data processing request, a feature value of first original data in the data processing request is extracted based on a first smart contract in a blockchain network, historical data saved in the blockchain network is matched based on the extracted feature value so as to determine whether there is target historical data whose similarity with the first original data satisfies a predetermined condition in the historical data, and corresponding processing is performed based on matching result information of the matching processing. Therefore, work data of a user is saved in a blockchain network, and matching processing is performed based on historical data saved in the blockchain network when a data processing request is received to ensure that the data saved in the blockchain cannot be tampered with, and the accuracy of a matching result is further guaranteed. Moreover, based on the characteristics of the blockchain network, the problems such as unreliable matching results caused by attack are avoided. Meanwhile, a feature value is extracted and matching processing is performed based on the feature value so that it is difficult for the works to escape from infringement determination even if the user makes simple modification to the works, and therefore the accuracy of the matching result is improved. Moreover, the feature value is extracted based on a smart contract so that an extraction rule for the feature value is traceable and can be upgraded and optimized, thereby continuously improving the extraction performance of the feature value, and also continuously improving the accuracy of the matching result.

It is worthwhile to note that the embodiments of the present specification relating to the data processing device are based on the same inventive concept as the embodiments of the present specification relating to the data processing method. Therefore, for specific implementations of the embodiments, references can be made to the implementations of the corresponding data processing method previously described. Repetitions are omitted here for simplicity.

Further, corresponding to the data processing method previously described, based on the same technical concept, one or more embodiments of the present specification further provide a storage medium, configured to store computer-executable instructions. In one or more specific embodiments, the storage medium can be a U disk, an optical disk, a hard disk, etc. The computer-executable instructions stored in the storage medium, when being executed by a processor, can implement the following procedure: receiving a data processing request sent by a first user, where the data processing request includes first original data to be processed; invoking a first smart contract deployed in a blockchain network, and extracting a feature value of the first original data based on the first smart contract; matching historical data saved in the blockchain network based on the feature value so as to determine whether there is target historical data whose similarity with the first original data satisfies a predetermined condition in the historical data; and performing corresponding processing based on matching result information of the matching processing.

When the computer-executable instructions stored in the storage medium provided in one or more embodiments of the present specification are executed by the processor, a data processing request sent by a first user is received, a feature value of first original data in the data processing request is extracted based on a first smart contract in a blockchain network, historical data saved in the blockchain network is matched based on the extracted feature value so as to determine whether there is target historical data whose similarity with the first original data satisfies a predetermined condition in the historical data, and corresponding processing is performed based on matching result information of the matching processing. Therefore, work data of a user is saved in a blockchain network, and matching processing is performed based on historical data saved in the blockchain network when a data processing request is received to ensure that the data saved in the blockchain cannot be tampered with, and the accuracy of a matching result is further guaranteed. Moreover, based on the characteristics of the blockchain network, the problems such as unreliable matching results caused by attack are avoided. Meanwhile, a feature value is extracted and matching processing is performed based on the feature value so that it is difficult for the works to escape from infringement determination even if the user makes simple modification to the works, and therefore the accuracy of the matching result is improved. Moreover, the feature value is extracted based on a smart contract so that an extraction rule for the feature value is traceable and can be upgraded and optimized, thereby continuously improving the extraction performance of the feature value, and also continuously improving the accuracy of the matching result.

Optionally, when the computer-executable instructions stored in the storage medium are executed by the processor, the extracting a feature value of the first original data based on the first smart contract includes the following: determining data type information of the first original data based on the first smart contract; and selecting a target second smart contract matched with the data type information from a plurality of pre-deployed second smart contracts, and extracting a feature value of the first original data based on the target second smart contract, where the second smart contract is provided with an extraction rule for a feature value of first original data of a corresponding data type.

Optionally, when the computer-executable instructions stored in the storage medium are executed by the processor, the matching historical data saved in the blockchain network based on the feature value so as to determine whether there is target historical data whose similarity with the first original data satisfies a predetermined condition in the historical data includes the following: performing fuzzy search processing on the feature value of the first original data and a feature value of historical data saved in the blockchain network so as to obtain candidate historical data satisfying a first predetermined condition from the historical data; calculating a similarity between the first original data and each piece of the candidate historical data based on a predetermined similarity calculation method; and determining whether there is target historical data whose similarity with the first original data satisfies a second predetermined condition in the historical data based on the calculated similarity.

Optionally, when the computer-executable instructions stored in the storage medium are executed by the processor, the data processing request includes a data preservation request.

After the extracting a feature value of the first original data based on the first smart contract, the procedure further includes the following:

associatively saving the feature value and the first original data in the blockchain network, and sending preservation success information to the first user.

Optionally, when the computer-executable instructions stored in the storage medium are executed by the processor, the data processing request includes a retrieval request.

The performing corresponding processing based on matching result information of the matching processing includes the following: if the existence of the target historical data is determined based on the matching result information of the matching processing, sending retrieval result information to the first user based on related information of the target historical data.

When the computer-executable instructions stored in the storage medium provided by one or more embodiments of the present specification are executed by the processor, a data processing request sent by a first user is received, a feature value of first original data in the data processing request is extracted based on a first smart contract in a blockchain network, historical data saved in the blockchain network is matched based on the extracted feature value so as to determine whether there is target historical data whose similarity with the first original data satisfies a predetermined condition in the historical data, and corresponding processing is performed based on matching result information of the matching processing. Therefore, work data of a user is saved in a blockchain network, and matching processing is performed based on historical data saved in the blockchain network when a data processing request is received to ensure that the data saved in the blockchain cannot be tampered with, and the accuracy of a matching result is further guaranteed. Moreover, based on the characteristics of the blockchain network, the problems such as unreliable matching results caused by attack are avoided. Meanwhile, a feature value is extracted and matching processing is performed based on the feature value so that it is difficult for the works to escape from infringement determination even if the user makes simple modification to the works, and therefore the accuracy of the matching result is improved. Moreover, the feature value is extracted based on a smart contract so that an extraction rule for the feature value is traceable and can be upgraded and optimized, thereby continuously improving the extraction performance of the feature value, and also continuously improving the accuracy of the matching result.

It is worthwhile to note that the embodiments of the present specification relating to the storage medium are based on the same inventive concept as the embodiments of the present specification relating to the data processing method. Therefore, for specific implementations of the embodiments, references can be made to the implementations of the corresponding data processing method previously described. Repetitions are omitted here for simplicity.

The specific embodiments of the present specification are described above. Other embodiments fall within the scope of the appended claims. In some cases, the actions or steps described in the claims can be performed in an order different from the order in the embodiments and can still achieve the desired results. In addition, the process depicted in the accompanying drawings does not necessarily require the shown particular order or consecutive sequence to achieve the desired results. In some implementations, multi-task processing and parallel processing can or may be advantageous.

In the 1990s, whether technology improvement is hardware improvement (for example, improvement of a circuit structure, such as a diode, a transistor, or a switch) or software improvement (improvement of a method procedure) can be clearly distinguished. However, with the development of technologies, current improvement for many method procedures can be considered as direct improvement of hardware circuit structures. A designer usually programs an improved method procedure to a hardware circuit to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a first user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicon Labs C8051F320. The memory controller can also be implemented as a part of the control logic of the memory. A person skilled in the art also know that, in addition to implementing a controller by using computer-readable program code, the method steps can be logically programmed, so that the controller implements the same functions in the form of a logic gate, a switch, an application-specific integrated circuit, a programmable logic controller, an embedded microcontroller, etc. Therefore, the controller can be regarded as a hardware component, and an apparatus included therein for implementing various functions can also be regarded as the structure within the hardware component. Or even, the apparatus for implementing various functions can be regarded as both a software module for implementing a method and the structure within the hardware component.

The system, apparatus, module, or unit illustrated in the previously described embodiments can be specifically implemented by using a computer chip or an entity, or can be implemented by using a product with a certain function. A typical implementation device is a computer. Specifically, the computer can be, for example, a personal computer, a laptop computer, a cellular phone, a camera phone, a smart phone, a personal digital assistant, a media player, a navigation device, an email receiving and transmitting device, a game console, a tablet computer, a wearable device, or any combination of these devices.

For ease of description, the above apparatus is divided into various units based on functions for separate description. Certainly, functions of the units can be implemented in the same or different software or hardware when the embodiments of the present specification are implemented.

A person skilled in the art should understand that one or more embodiments of the present specification can be provided as a method, a system, or a computer program product. As such, one or more embodiments of the present specification can take the form of complete hardware embodiments, complete software embodiments, or embodiments incorporating software and hardware. Further, the present specification can take a form of a computer program product implemented on one or more computer-usable storage media (including but not limited to disk storage, CD-ROM, and optical storage) containing computer-usable program code.

The present specification is described with reference to a flowchart or block diagram of the method, device (system), and computer program product according to the embodiments of the present specification. It is worthwhile to note that computer program instructions can be used to implement each flow and/or each block in the flowchart and/or the block diagram and a combination of a flow and/or a block in the flowchart and/or the block diagram. These computer program instructions can be provided to a processor of a general-purpose computer, a special-purpose computer, an embedded processor or another programmable data processing device to produce a machine, so that the instructions executed by the processor of the computer or another programmable data processing device produce a device for implementing functions specified in one or more flows in the flowchart and/or one or more blocks in the block diagram.

These computer program instructions can also be stored in a computer-readable memory that can direct a computer or another programmable data processing device to operate in a specific way, so that the instructions stored in the computer-readable memory produce an article of manufacture including an instruction device, and the instruction device implements functions specified in one or more flows of the flowchart and/or one or more blocks of the block diagram.

These computer program instructions can also be loaded onto a computer or another programmable data processing device, so that a series of operation steps are performed on the computer or another programmable device to perform computer-implemented processing, and thus the instructions executed on the computer or another programmable device provide steps for implementing functions specified in one or more flows of the flowchart and/or one or more blocks of the block diagram.

In a typical configuration, a calculating device includes one or more processors (CPUs), an input/output interface, a network interface, and a memory.

The memory may include a non-persistent memory, a random access memory (RAM), and/or a non-volatile memory in a computer-readable medium, such as a read-only memory (ROM) or a flash RAM. The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette, a magnetic disk storage or another magnetic storage device or any other non-transmission medium. The computer storage medium can be configured to store information that can be accessed by a computing device. Based on the definition in the present specification, the computer-readable medium does not include transitory media such as a modulated data signal and carrier.

It is also worthwhile to note that terms "include", "comprise" or any other variants thereof are intended to cover non-exclusive inclusion, so that processes, methods, products, or devices that include a series of elements include not only those elements but also other elements that are not explicitly listed, or elements inherent in such processes, methods, products, or devices. An element preceded by "includes a . . . " does not, without more constraints, preclude the presence of additional identical elements in the process, method, product, or device that includes the element.

One or more embodiments of the present specification can be described in the general context of computer-executable instructions, such as a program module, executed by a computer. Generally, the program module includes a routine, program, object, component, data structure, etc. for executing a particular task or implementing a particular abstract data type. One or more embodiments of the present specification can also be practiced in distributed computing environments where tasks are performed by remote processing devices connected through a communications network. In the distributed computing environments, the program modules can be located in both local and remote computer storage media including storage devices.

The embodiments in the present specification are described in a progressive way. For same or similar parts of the embodiments, mutual references can be made to the embodiments. Each embodiment focuses on a difference from other embodiments. In particular, a system embodiment is basically similar to a method embodiment, and therefore is described briefly. For related parts, references can be made to related descriptions in the method embodiment.

The above descriptions are merely embodiments of the present specification, and are not intended to limit the present file. For a person skilled in the art, the present file can be subject to various modifications and variations. Any modifications, equivalent replacements, improvements, etc. that are made within the spirit and principles of the present file shall all be included within the scope of the claims of the present file.

What is claimed is:

1. A computer-implemented method comprising:
    receiving, from a first user device that is associated with a first user, a data processing request that comprises first original data to be processed;
    invoking a first smart contract deployed in a blockchain network;
    extracting a feature value of the first original data based on the first smart contract, wherein extracting the feature value comprises:
        determining data type information of the first original data based on the first smart contract;
        obtaining, based on the data type information, a target extraction rule based on an association relationship between the data type information and extraction rules comprised in the first smart contract; and
        extracting the feature value of the first original data based on the target extraction rule;
    determining that target historical data whose similarity with the first original data satisfies a predetermined condition exists in historical data that is saved in the blockchain network; and
    in response to determining that the target historical data exists in the historical data that is saved in the blockchain network, performing the requested data processing.

2. The method of claim 1, wherein extracting the feature value comprises:
    determining the data type information of the first original data based on the first smart contract;
    selecting a target second smart contract that is matched with the data type information from a plurality of pre-deployed second smart contracts and that comprises an extraction rule for a feature value of first original data of a corresponding data type; and
    extracting the feature value of the first original data based on the target second smart contract.

3. The method of claim 2, wherein selecting the target second smart contract comprises:
    obtaining associated target contract identification information based on a predetermined association relationship between the data type information and contract identification information based on the data type information; and
    selecting a second smart contract corresponding to a target contract identification information as the target second smart contract that is matched with the data type information.

4. The method of claim 1, wherein determining the data type information comprises:
    identifying, based on the first smart contract, the first original data by using a predetermined type identification technique to obtain the data type information of the first original data, or obtaining the data type information of the first original data from the data processing request based on the first smart contract.

5. The method of claim 1, wherein determining that the target historical data exists comprises:
   obtaining, based at least on performing fuzzy search processing on the feature value of the first original data and a feature value of historical data saved in the blockchain network, candidate historical data satisfying a first predetermined condition from the historical data;
   determining a similarity between the first original data and each piece of the candidate historical data based on a predetermined similarity calculation method; and
   determining whether the target historical data whose similarity with the first original data satisfies a second predetermined condition exists in the historical data based on a determined similarity.

6. The method of claim 5, wherein performing the fuzzy search processing comprises:
   indexing the feature value of the first original data and the feature value corresponding to the historical data saved in the blockchain network based on a predetermined indexing technique to obtain a target feature value satisfying the first predetermined condition; and
   determining historical data corresponding to the target feature value as the candidate historical data.

7. The method of claim 1, wherein:
   the data processing request comprises a data preservation request; and
   the method further comprises, after extracting the feature value of the first original data based on the first smart contract:
      associatively saving the feature value and the first original data in the blockchain network, and
      sending preservation success information to the first user device.

8. The method of claim 7, wherein performing corresponding processing comprises, in response to determining that the target historical data exists:
   sending first prompt information indicating an existence of similar data to the first user device associated with the first user based on related information of the target historical data, and
   sending second prompt information indicating the existence of similar data to a second user device associated with a second user corresponding to the target historical data based on related information of the first original data.

9. The method of claim 8, comprising, after sending the first prompt information indicating the existence of similar data to the first user device associated with the first user based on related information of the target historical data:
   receiving the data preservation request sent by the first user device associated with the first user,
   wherein the data preservation request comprises second original data to be preserved obtained by updating the first original data based on the first prompt information; and
   preserving the second original data.

10. The method of claim 1, wherein:
    the data processing request comprises a retrieval request; and
    performing corresponding processing based on matching result information of the matching processing comprises:
       in response to determining that the target historical data exists, sending retrieval result information to the first user device associated with the first user based on related information of the target historical data.

11. A non-transitory, computer-readable medium storing one or more instructions executable by a computer system to perform operations comprising:
    receiving, from a first user device that is associated with a first user, a data processing request that comprises first original data to be processed;
    invoking a first smart contract deployed in a blockchain network;
    extracting a feature value of the first original data based on the first smart contract, wherein extracting the feature value comprises:
       determining data type information of the first original data based on the first smart contract;
       obtaining, based on the data type information, a target extraction rule based on an association relationship between the data type information and extraction rules comprised in the first smart contract; and
       extracting the feature value of the first original data based on the target extraction rule;
    determining that target historical data whose similarity with the first original data satisfies a predetermined condition exists in historical data that is saved in the blockchain network; and
    in response to determining that the target historical data exists in the historical data that is saved in the blockchain network, performing the requested data processing.

12. A computer-implemented system comprising:
    at least one processor; and
    one or more memories coupled to the at least one processor and storing programming instructions for execution by the at least one processor to perform operations comprising:
       receiving, from a first user device that is associated with a first user, a data processing request that comprises first original data to be processed;
       invoking a first smart contract deployed in a blockchain network;
       extracting a feature value of the first original data based on the first smart contract, wherein extracting the feature value comprises:
          determining data type information of the first original data based on the first smart contract;
          obtaining, based on the data type information, a target extraction rule based on an association relationship between the data type information and extraction rules comprised in the first smart contract; and
       extracting the feature value of the first original data based on the target extraction rule;
          determining that target historical data whose similarity with the first original data satisfies a predetermined condition exists in historical data that is saved in the blockchain network; and
       in response to determining that the target historical data exists in the historical data that is saved in the blockchain network, performing the requested data processing.

13. The system of claim 12, wherein extracting the feature value comprises:
    determining the data type information of the first original data based on the first smart contract;

selecting a target second smart contract that is matched with the data type information from a plurality of pre-deployed second smart contracts and that comprises an extraction rule for a feature value of first original data of a corresponding data type; and extracting the feature value of the first original data based on the target second smart contract.

14. The system of claim 13, wherein selecting the target second smart contract comprises:
obtaining associated target contract identification information based on a predetermined association relationship between the data type information and contract identification information based on the data type information; and
selecting a second smart contract corresponding to a target contract identification information as the target second smart contract that is matched with the data type information.

15. The system of claim 12, wherein determining the data type information comprises:
identifying, based on the first smart contract, the first original data by using a predetermined type identification technique to obtain the data type information of the first original data, or
obtaining the data type information of the first original data from the data processing request based on the first smart contract.

16. The system of claim 12, wherein determining that the target historical data exists comprises:
obtaining, based at least on performing fuzzy search processing on the feature value of the first original data and a feature value of historical data saved in the blockchain network, candidate historical data satisfying a first predetermined condition from the historical data;
determining a similarity between the first original data and each piece of the candidate historical data based on a predetermined similarity calculation method; and
determining whether the target historical data whose similarity with the first original data satisfies a second predetermined condition exists in the historical data based on a determined similarity.

17. The system of claim 16, wherein performing the fuzzy search processing comprises:
indexing the feature value of the first original data and the feature value corresponding to the historical data saved in the blockchain network based on a predetermined indexing technique to obtain a target feature value satisfying the first predetermined condition; and
determining historical data corresponding to the target feature value as the candidate historical data.

18. The system of claim 12, wherein:
the data processing request comprises a data preservation request; and
after extracting the feature value of the first original data based on the first smart contract, the at least one processor performs the operations further comprising:
associatively saving the feature value and the first original data in the blockchain network, and
sending preservation success information to the first user device.

* * * * *